US006806883B2

(12) United States Patent
Lavelle et al.

(10) Patent No.: US 6,806,883 B2
(45) Date of Patent: Oct. 19, 2004

(54) SYSTEM AND METHOD FOR HANDLING DISPLAY DEVICE REQUESTS FOR DISPLAY DATA FROM A FRAME BUFFER

(75) Inventors: Michael G. Lavelle, Saratoga, CA (US); Yan Yan Tang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 280 days.

(21) Appl. No.: 10/094,930

(22) Filed: Mar. 11, 2002

(65) Prior Publication Data

US 2003/0169262 A1 Sep. 11, 2003

(51) Int. Cl.[7] ................................................ G06F 13/18

(52) U.S. Cl. ........................ 345/535; 345/520; 345/534; 345/545; 711/5; 711/150; 711/167

(58) Field of Search ................................ 345/503, 520, 345/531, 533–535, 545, 554

(56) References Cited

U.S. PATENT DOCUMENTS

| | | | | | |
|---|---|---|---|---|---|
| 5,544,306 | A | | 8/1996 | Deering et al. | |
| 5,854,638 | A | * | 12/1998 | Tung | 345/542 |
| 5,875,470 | A | * | 2/1999 | Dreibelbis et al. | 711/147 |
| 6,006,303 | A | * | 12/1999 | Barnaby et al. | 710/244 |
| 6,009,489 | A | * | 12/1999 | Mergard | 710/107 |
| 6,052,756 | A | * | 4/2000 | Barnaby et al. | 711/105 |
| 6,205,524 | B1 | * | 3/2001 | Ng | 711/151 |
| 6,363,445 | B1 | * | 3/2002 | Jeddeloh | 710/113 |
| 6,437,789 | B1 | | 8/2002 | Tidwell et al. | |
| 6,505,260 | B2 | * | 1/2003 | Chin et al. | 710/41 |
| 6,563,506 | B1 | * | 5/2003 | Wang | 345/535 |
| 2002/0174292 | A1 | * | 11/2002 | Morita et al. | 711/105 |
| 2003/0088744 | A1 | * | 5/2003 | Jain et al. | 711/150 |

* cited by examiner

*Primary Examiner*—Ulka J. Chauhan
(74) *Attorney, Agent, or Firm*—Meyertons Hood Kivlin Kowert & Goetzel, P.C.; Jeffrey C. Hood

(57) ABSTRACT

A graphics system may include a frame buffer, a processing device coupled to access data in the frame buffer, a frame buffer interface coupled to the frame buffer, and an output controller configured to assert a request for display data to provide to a display device. The frame buffer interface may receive the request for display data from the output controller and delay providing the request for display data to the frame buffer if the processing device is currently requesting access to a portion of the frame buffer targeted by the request for display data. For example, if the frame buffer includes several memory banks and the request for display data targets a first bank, the frame buffer interface may delay providing the request for display data to the frame buffer if the processing device is currently requesting access to the first bank.

17 Claims, 12 Drawing Sheets

Portion of Sample Space

SYSTEM AND METHOD FOR HANDLING DISPLAY DEVICE REQUESTS FOR DISPLAY DATA FROM A FRAME BUFFER

BACKGROUND OF THE INVENTION

1. Field of the Invention

This invention relates to graphics systems and, more particularly, to handling requests for display data from a frame buffer.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating, "draw a box at these coordinates." The graphics system then draws the box, freeing the processor to perform other tasks.

Generally, a graphics system in a computer is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphics applications, and especially multimedia applications, has made high performance graphics systems a common feature in many new computer systems. Most computer manufacturers now bundle a high performance graphics system with their computing systems.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

A converter (e.g., a digital-to-analog converter) converts the pixels into an appropriate display signal usable by a display device. If samples are used, the samples may be read out of sample buffer or frame buffer and filtered to generate pixels, which may be stored and later conveyed to a converter. The signal from such a converter is conveyed to a display device such as a computer monitor, LCD display, or projector.

Display data (e.g., pixels or samples) is typically output from a frame buffer to an output device (e.g., a digital-to-analog converter)) for display. However, since the frame buffer may also be accessed by other device(s) in the graphics system, display accesses may adversely impact the other devices' performance.

SUMMARY

Various embodiments of a graphics system that is configured to handle display requests for display data in a frame buffer are disclosed. In one embodiment, a graphics system includes a frame buffer, a processing device coupled to the frame buffer and configured to access data in the frame buffer, a frame buffer interface coupled to the frame buffer, and an output controller coupled to the frame buffer interface and configured to provide display data to a display device. The output controller is configured to assert a first request for display data. The frame buffer interface is configured to receive the first request for display data from the output controller and to delay providing the first request for display data to the frame buffer if the processing device is currently requesting access to a portion of the frame buffer targeted by the first request for display data. For example, if the frame buffer includes several banks of memory and the first request for display data targets a first one of the banks, the frame buffer interface may delay providing the first request to the frame buffer if the processing device is currently requesting access to the first one of the banks.

BRIEF DESCRIPTION OF THE DRAWINGS

A better understanding of the present invention can be obtained when the following detailed description is considered in conjunction with the following drawings, in which.

Figure 1:
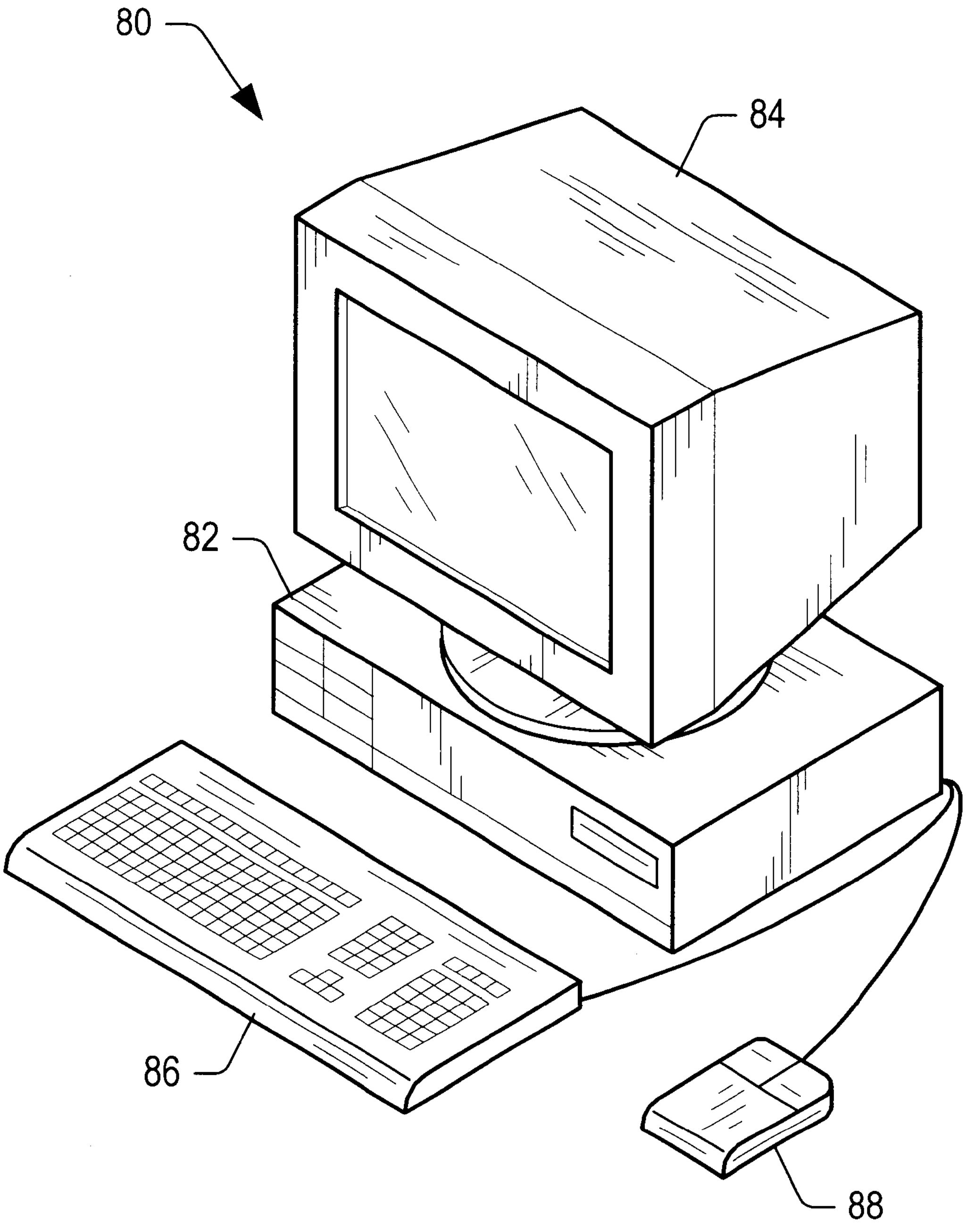
FIG. 1 is a perspective view of one embodiment of a computer system.

While the invention admits various modifications and alternative forms, specific embodiments thereof are shown by way of example in the drawings and will herein be described in detail. It should be understood, however, that the drawings and detailed description thereto are not intended to limit the invention to the particular form (or forms) disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include," and derivations thereof, mean "including, but not limited to". The term "connected" means "directly or indirectly connected," and the term "coupled" means "directly or indirectly coupled."

DETAILED DESCRIPTION OF EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
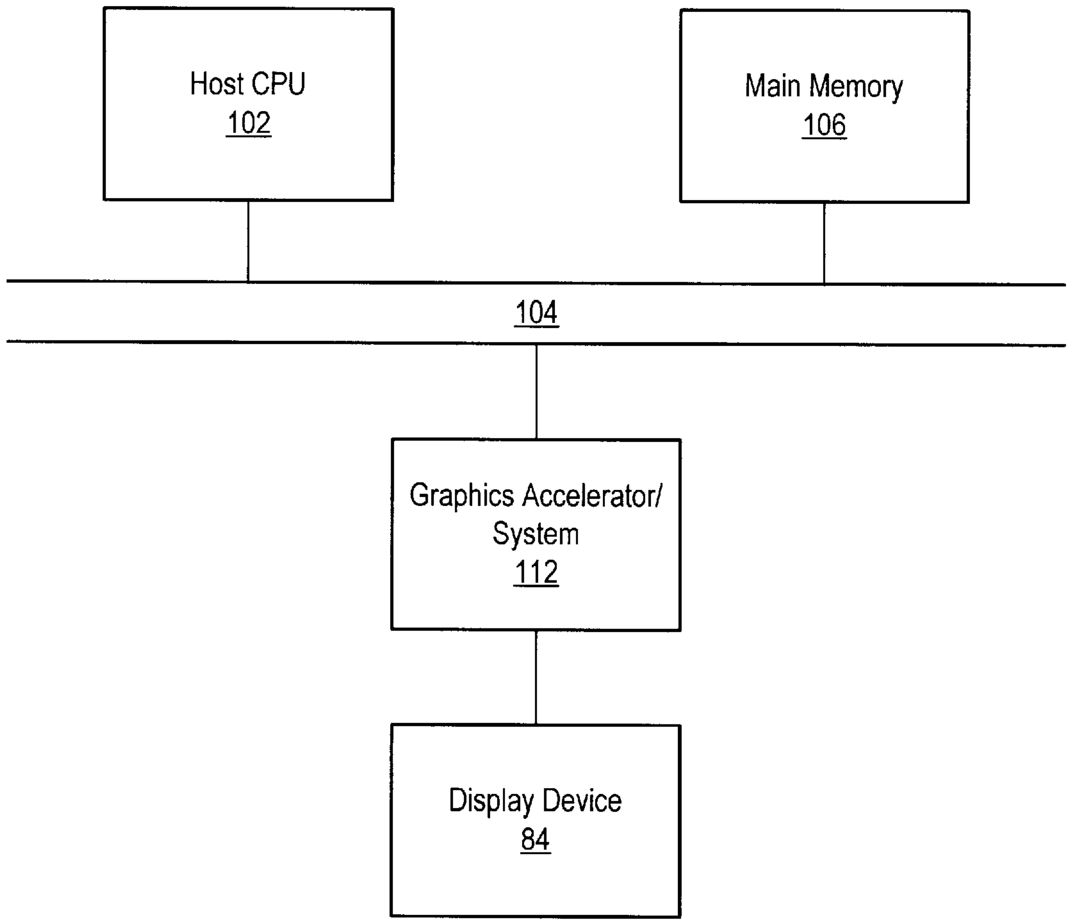
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
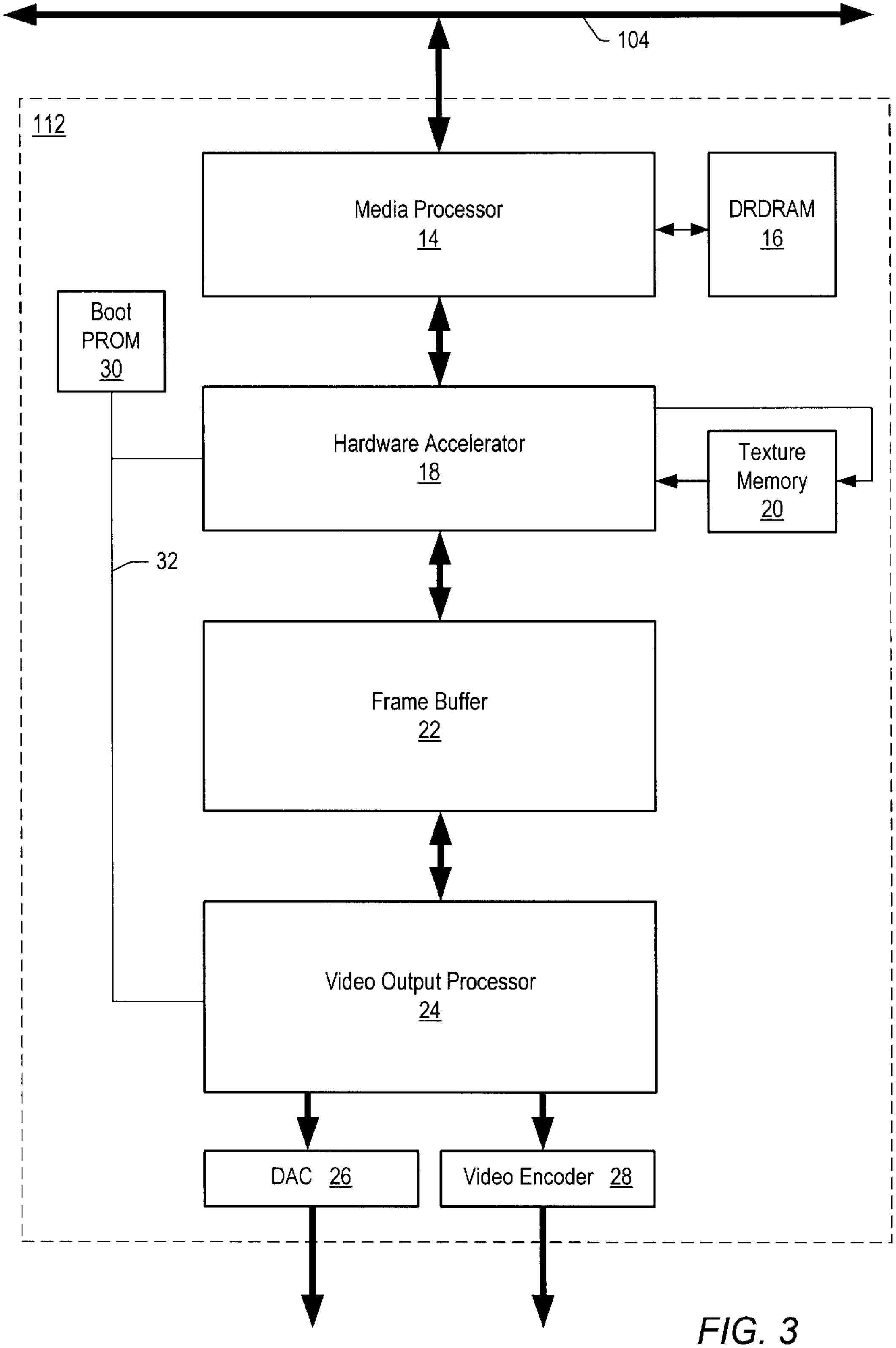
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
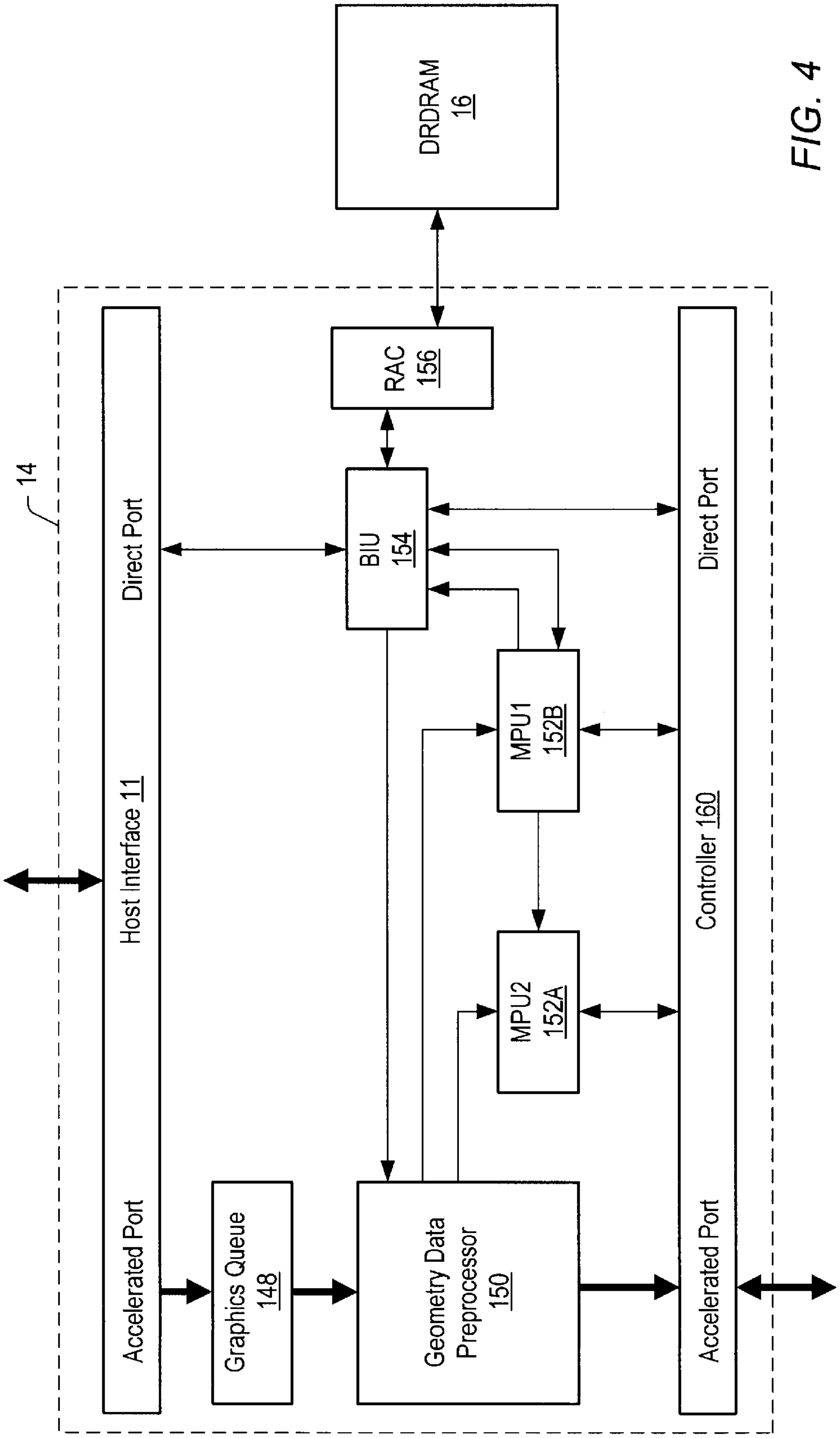
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), nonlinear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
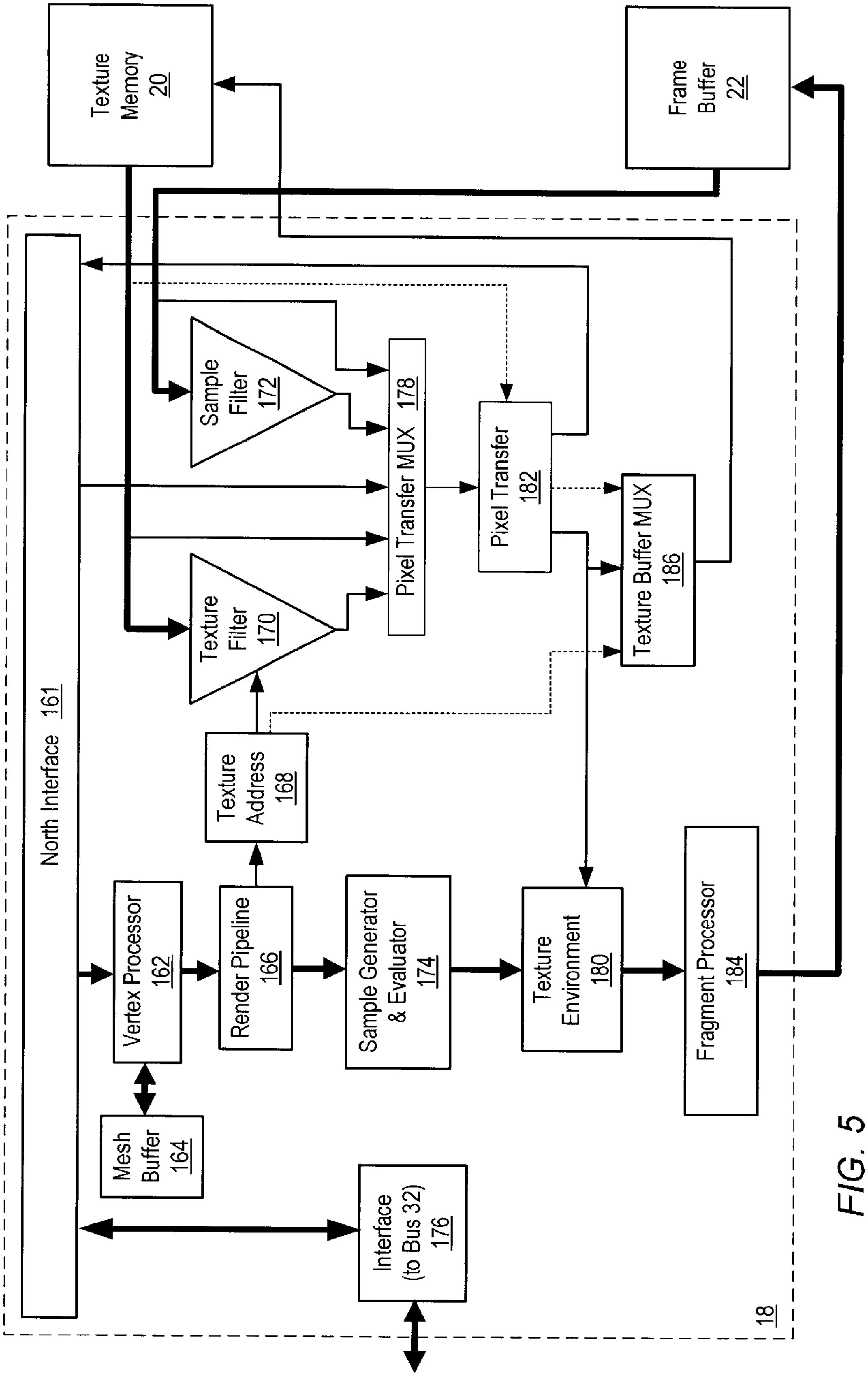
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from farther processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e., transparency);

z (i.e., depth); and s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g., addresses for a set of neighboring texels) and to determine interpolation coefficients for the texture filter 170. The texel addresses are used to access texture data (i.e., texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display data buffer, while other portions may be used as an offscreen pixel buffer and sample buffer.

Figure 6:
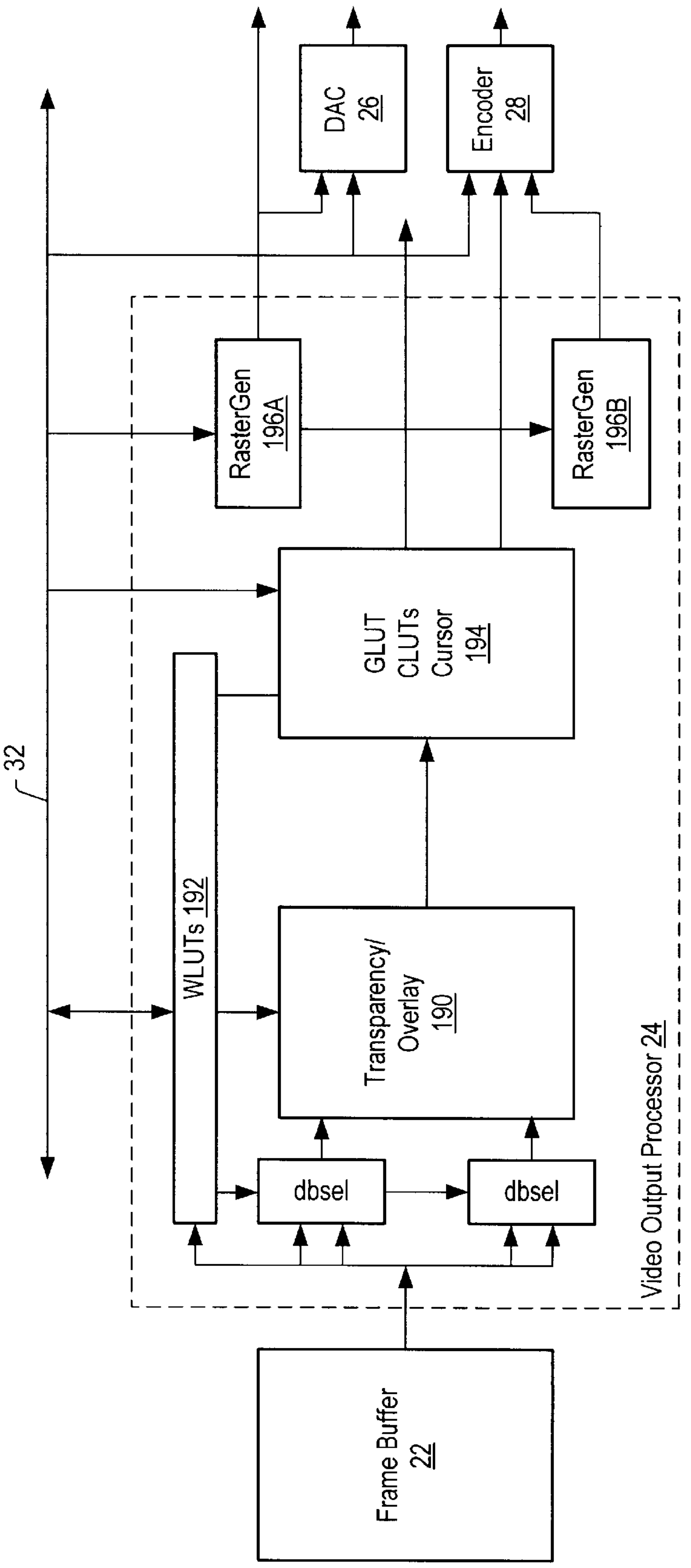
FIG. 6 is a functional block diagram of one embodiment of the video output processor of FIG. 3.

Video Output Processor—FIG. 6

A video output processor 24 may also be included within graphics system 112. Video output processor 24 may buffer and process display data (e.g., pixels and/or samples) output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3D-RAM64s 201 that include the transparency overlay 190 and all or some of the WLUTs 192. Video output processor 24 may also be configured to support multiple video output streams (e.g., video output processor may provide output streams to two displays using the two independent video raster timing generators 196). For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 may translate digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output display data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
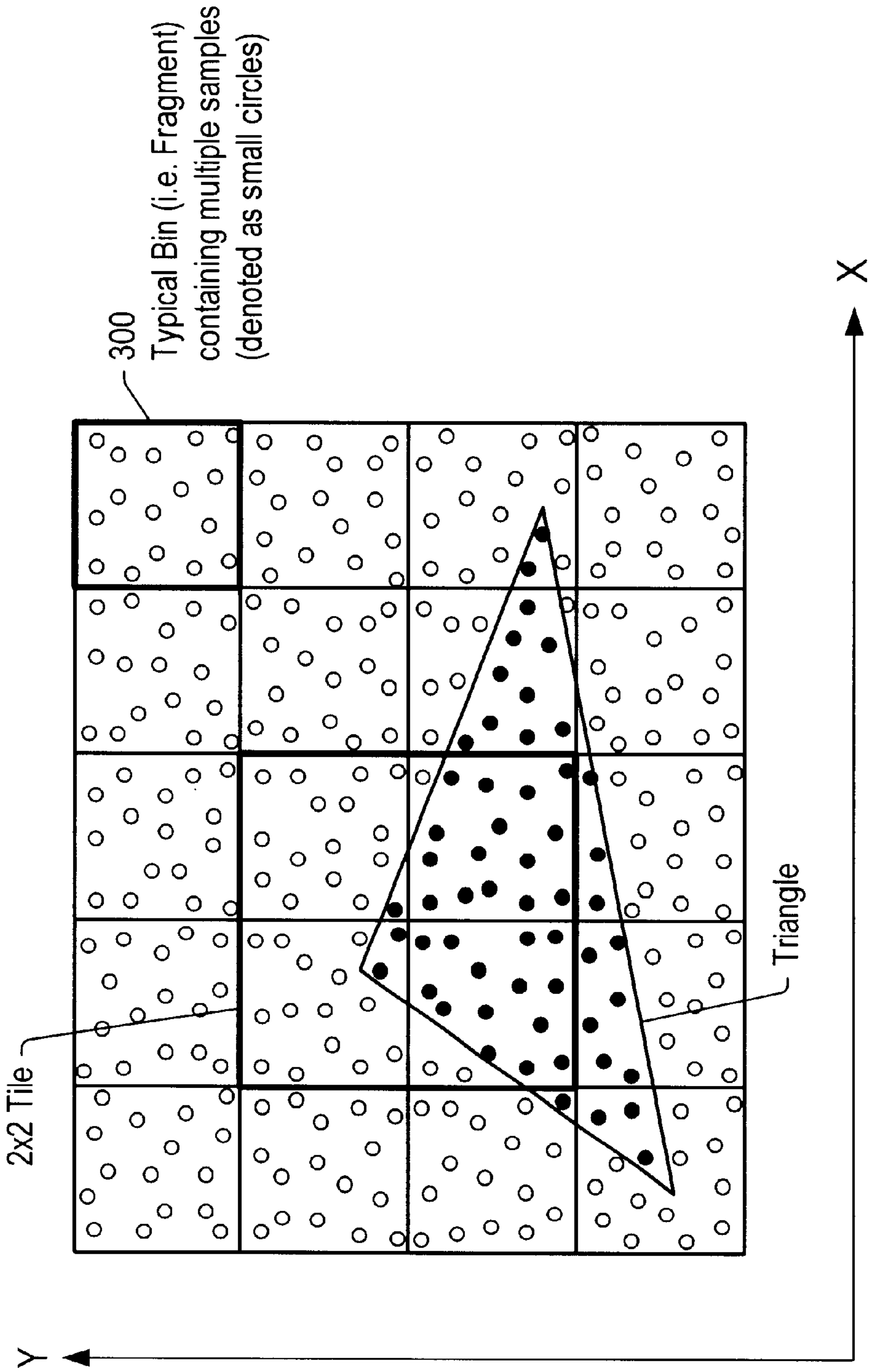
FIG. 7 shows how samples may be organized into bins in one embodiment.

Sample-to-Pixel Processing Flow—FIG. 7

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and/or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Display Request Handling

Display data is output from the frame buffer 22 to an output device (e.g., a DAC or an output controller 24 similar to the one in FIG. 6) that processes the display data and/or provides the display data to one or more display devices. The frame buffer 22 outputs display data to an output device in response to receiving a request for display data from the output device. The output device may assert requests in response to a display device's actual and/or theoretical demand for display data. In some embodiments, the output device may assert the requests in order to prefetch data from the frame buffer 22. The output device may assert requests by toggling or asserting one or more control signals and by providing an indication of the particular display data requested (e.g., by indicating whether the requested display data is the first set of data in a scanline and whether the current scanline is the first scanline in a frame).

Since the frame buffer 22 may also be used by one or more other devices (e.g., hardware accelerator 18) in the graphics system, it may be desirable to control the times at which display requests are presented to the frame buffer so that display requests have a reduced impact on other devices' accesses to the frame buffer 22. Furthermore, in some embodiments, the frame buffer 22 may be structured so that certain memory access patterns (e.g., alternating between memory banks when outputting sequential bursts of display data) provide improved performance over other memory access patterns (e.g., sequential accesses to the same memory bank). Thus, in such embodiments, it may also be desirable to prioritize higher-performing access patterns over lower-performing access patterns by controlling the times at which certain display requests are presented to the frame buffer 22.

Figure 8:
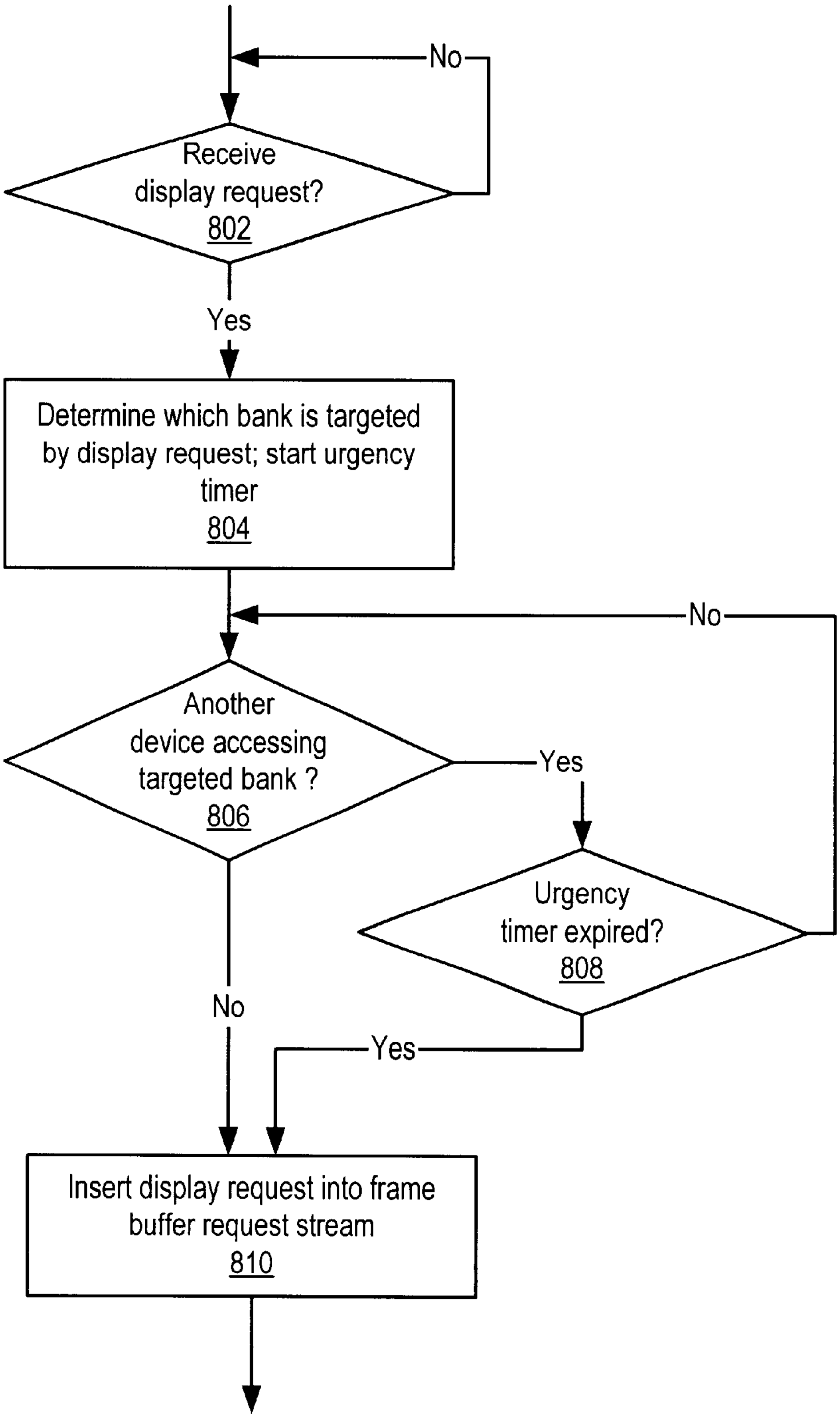
FIG. 8 shows a flowchart of one embodiment of a method of handling a request for display data.

FIG. 8 shows one embodiment of a method of handling display requests for display data in a frame buffer that includes one or more memory banks. In some embodiments that include multiple memory banks, some of the banks may be independently accessible. Thus, different devices may simultaneously access the frame buffer so long as they are each accessing a different bank and so long as the banks being accessed are both independently accessible. If a display request is received, the bank of the frame buffer targeted by the display request is determined, as indicated at 802 and 804. If another device is currently accessing and/or requesting access to the targeted bank, the display request may not be provided to the frame buffer until a later time, as indicated at 806. For example, the other device may currently be accessing the frame buffer if it is sending a stream of address and control signals to the frame buffer. The other device may be requesting access to the targeted bank if, for example, pending requests are queued before being provided to the frame buffer (e.g., display requests may be queued in one queue and rendering requests may be stored in another)

and there is currently a queued request from the other device that targets the requested bank.

If the bank is not currently being accessed and/or targeted in another pending request by another device, the display request may be provided to the frame buffer (e.g., by inserting the display request into the frame buffer's request stream, as indicated at 806 and 810). For example, if there is a gap in the other device's request stream (or at least the portion of the other device's request stream that targets the requested bank), the display request may be "slipped into" the request stream for the requested bank during that gap.

In some embodiments, an urgency timer may also be started (e.g., by initializing a counter that will be decremented on each subsequent clock cycle) in response to receiving the display request, as indicated at 804. This urgency timer expires (e.g., a counter may be decremented to zero) after a certain amount of time, indicating that the display request should now be provided to the frame buffer, even if doing so would interrupt or delay another device's access to the frame buffer (e.g., by selecting the display request instead of a queued rendering request or by inserting the display request into the other device's request stream and, as a result, delaying the other device's requests after the inserted display request). In such an embodiment, expiration of the urgency timer causes the display request to be provided to the frame buffer (e.g., by inserting the display request in to the request stream being provided to the frame buffer, as indicated at 808 and 810). Use of an urgency timer may ensure that display requests are provided to the frame buffer in time to prevent gaps in the display data stream that could adversely affect the display seen by a user.

Note that in some embodiments, certain types of accesses may be prioritized over other types of accesses. Thus, determining whether to provide a display request to the frame buffer may involve determining what type of access is currently taking place and/or being requested at the targeted bank. Certain types of access may not be interrupted or delayed by display requests (at least not before expiration of the urgency timer), while other types of accesses may be interrupted or delayed by display requests. Thus, if another device is currently accessing or requesting access to the targeted bank, that device's access may be interrupted or delayed by the display information request if its access has a lower priority than the display request.

Figure 9A:
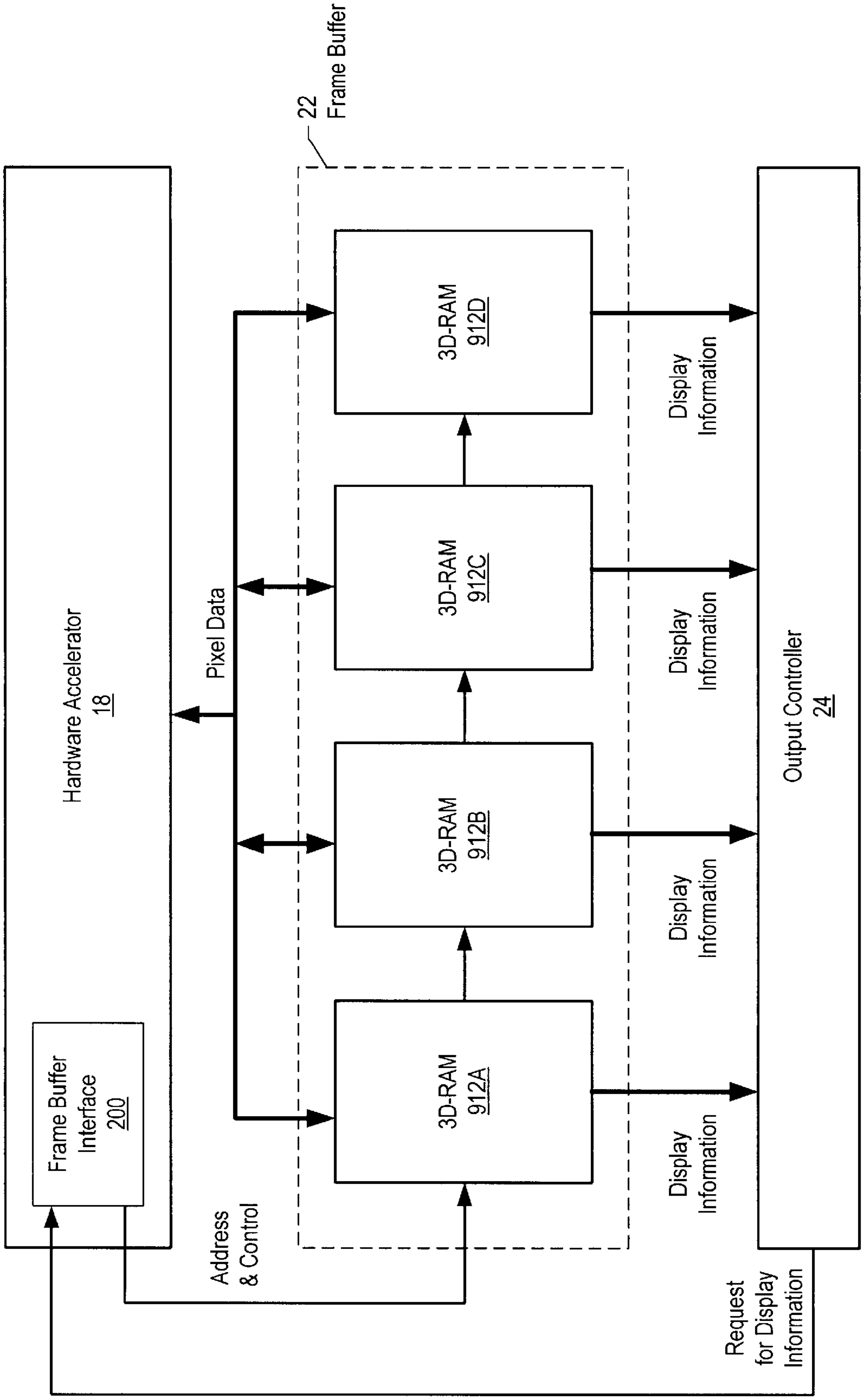
FIG. 9A is a functional block diagram of one embodiment of a graphics system.

FIG. 9A shows one embodiment of a portion of a graphics system. As shown, a frame buffer 22 may include multiple 3D-RAM devices 912 (such as those manufactured by Mitsubishi Electric Corporation). In this embodiment, four 3D-RAM devices 912A–912D (collectively, 3D-RAM devices 912) are accessible by both a hardware accelerator 18 and an output controller 24. In this embodiment, the hardware accelerator 18 includes a frame buffer interface 200 that is configured to handle requests for data stored in the frame buffer 22. Display requests from the output controller 24 are provided to the frame buffer interface 200. The frame buffer interface 200 may use an embodiment of a method like the one illustrated in FIG. 8 to determine when to insert the display requests into the stream of control and data signals being sent to the frame buffer 22 in order to effect various memory operations and data transfers. Note that other embodiments may include different numbers and/or types of memory devices 912.

Figure 9B:
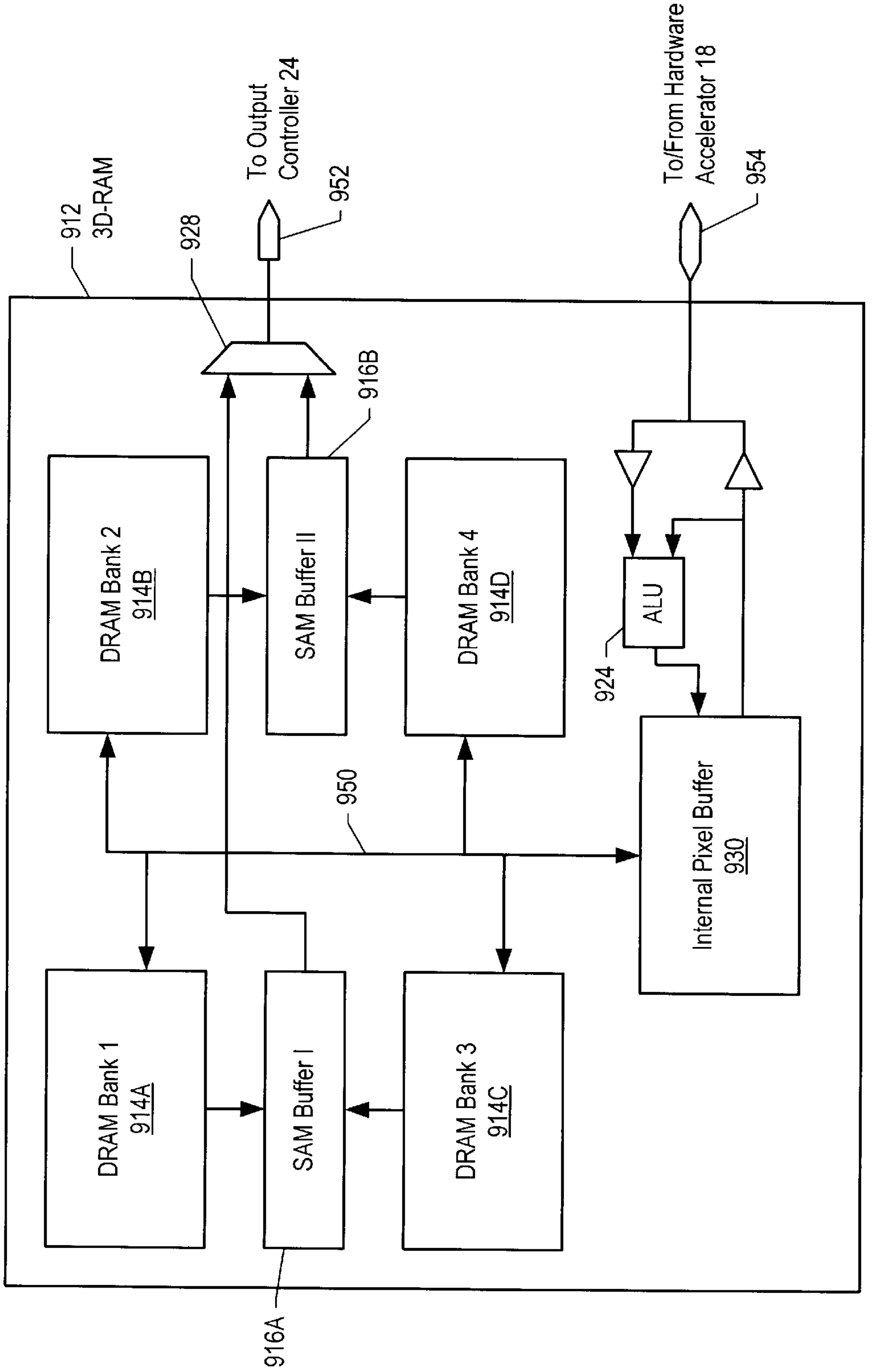
FIG. 9B is a functional block diagram of a 3D-RAM memory device.

FIG. 9B shows one embodiment of an individual 3D-RAM 912. 3D-RAM 912 includes four independent banks of DRAM 914A–914D (collectively referred to as DRAM 914). 3D-RAM 912 includes two access ports 952 and 954. The first port 952 is used to output display data from the two SAMs (Serial Access Memories) 916A and 916B (collectively, SAMs 916) to the output controller 24. The other port 954 is accessed by the hardware accelerator 18 to read and write pixels and/or samples. Pixels and samples may be read from the DRAM banks 914 into the internal buffer 930 via bus 950. The internal ALU (arithmetic logic unit) 924 may modify data stored in the buffer. While data is being modified, additional data may be written to the buffer 930. Since the 3D-RAM allows data to be modified as it is being read from the buffer (i.e., without having to output the data off-chip), operations such as Z-buffer and pixel blend operations may be more efficiently performed. For example, instead of such operations being performed as "read-modify-writes," these operations may be more efficiently performed as "mostly writes."

When providing bursts of display information to the output controller 24, the odd banks of DRAM output display information to a first SAM buffer 916A while the even banks output display information to a second SAM buffer 916B. Each buffer 916 may be loaded with display information in a single operation. Because of this configuration, display information may be read from the first SAM 916A while display information is being written to the second SAM 916B and vice versa. Multiplexer 928 may select the output from either SAM 916A or SAM 916B. The even (SAM II 916B) and odd (SAM I 916A) SAMs correspond to the even and odd DRAM banks 914.

Since one SAM may be loaded while the other is outputting display information, the 3D-RAM 912 may be able to output relatively continuous bursts of display data (e.g., on successive clock cycles, the final bit(s) of display data in SAM 916A and the first bit(s) of display data in SAM 916B may be shifted out to port 952) if successive display data requests alternately target even and odd banks within the 3D-RAM 912. For example, if it takes 8 frame buffer cycles to fill a SAM and 40 frame buffer cycles to provide a burst of data to the output controller from a SAM, the 8 fill cycles for one SAM may be hidden within the 40 output cycles of the other.

The frame buffer 22 may be interleaved, so satisfying a display request may involve providing a burst of display data from each of several of the 3D-RAMs 912. For example, returning to FIG. 9A, if one of the SAMs in each of the 3D-RAMs is capable of storing 20 pixels, bursts of 4*20 pixels (20 pixels from each 3D-RAM 916) may be provided by the frame buffer 22. If the requesting display is a 1280×1024 CRT, 16 bursts of 80 pixels each may provide the 1280 pixels in a scanline.

In order to benefit from the ability of each 3D-RAM to hide the fill cycles of one SAM in the read cycles of the other, display information in the frame buffer 22 may be stored so that successive burst requests for data in a display channel will alternate between targeting even and odd banks in each 3D-RAM. For example, a first request for a burst of display information may target bank 1 in each of the 3D-RAMs 912. The next request may target bank 2 in each 3D-RAM 912. In embodiments supporting multiple display channels (e.g., for stereo display and/or for multiple display devices), the output controller 24 may arbitrate between which display channel's requests are forwarded to the frame buffer interface 200 so that successive requests tend to alternately target even and odd banks in the 3D-RAMs.

Figure 9C:
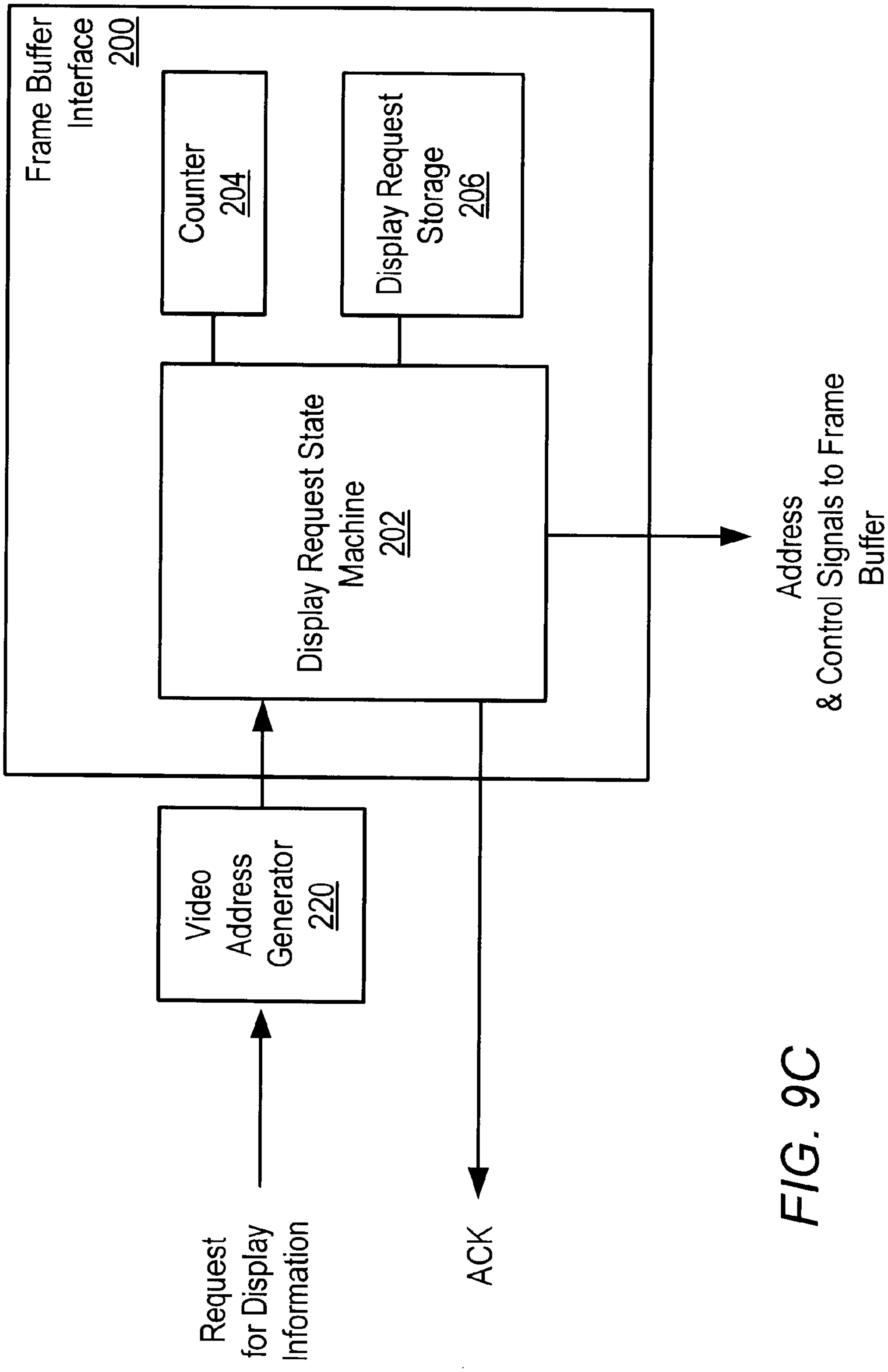
FIG. 9C is a functional block diagram of one embodiment of a frame buffer interface.

FIG. 9C illustrates one embodiment of a frame buffer interface 200. As illustrated, display requests from the output controller 24 may be processed by a video address generator 220 before being provided to the frame buffer interface 200. The video address generator 220 may translate the display request (which may identify a display stream in embodiments supporting multiple displays and whether the request is the first request in a scanline) into an indication of the physical location of the requested data within frame buffer 22. For example, the video address output by the video address generator 220 may indicate the bank(s) and/or page(s) in which the requested data is located. Note that in some embodiments, the frame buffer 22 may include multiple memory devices (as shown in FIG. 9A) that each include multiple banks. Display data may be interleaved so that the display data requested in any given request will be located in the same bank in each frame buffer memory device 912 in some embodiments. In other embodiments, the display data may be interleaved so that a portion of the display data stored in a first memory device 912A is stored in a first bank and a portion of the display data stored in another memory device 912B is stored in bank other than the first bank.

The frame buffer interface 200 may store a received display request in a display request queue or register 206. The frame buffer interface may also initiate an urgency timer, UT, in response to receiving the display request. In some embodiments, the frame buffer interface 200 may include several queues that each store different types of access requests (e.g., request for rendering access from hardware accelerator 188 requests for display data). The frame buffer interface 200 may select the oldest request from one of the queues and provide the selected request to the frame buffer. The particular queue that the frame buffer interface selects a request from may be determined according to a priority scheme (e.g., as described above with respect to FIG. 8). For example, the frame buffer interface may select from a queue of rendering access requests before selecting from the queue or register 206 that stores pending display requests. However, if the urgency timer for one of the display requests in queue or register 206 expires, the frame buffer interface may immediately provide that display request to the frame buffer.

If the bank(s) targeted by the display request are currently being accessed by or targeted by another request (e.g., asserted by hardware accelerator 18), the frame buffer interface 200 may delay providing the display request to the frame buffer 22, assuming that the urgency timer has not yet expired. If the operation currently being performed has a lower priority than the display request or if the urgency timer expires, the frame buffer interface 200 may provide the display request to the frame buffer 22, possibly interrupting or delaying another operation. Upon providing the display request to the frame buffer 22, the frame buffer interface 200 may generate an acknowledgment signal (e.g., by asserting or toggling a signal) to the output controller 24 (e.g., indicating that the display request is now being serviced and that the output controller 24 should expect valid data at port 952 after a certain number of cycles).

If a display request targets different banks in different memory devices (e.g., bank 1 in 3D-RAMs 912A and 912B and bank 2 in 3D-RAMs 912C and 912D), the frame buffer interface 200 may wait to provide the display request to the frame buffer until both of the targeted banks are available. In an alternative embodiment, the frame buffer interface 200 may separate the requests and handle each independently (although both requests may be associated with the same urgency timer). Thus, if one bank becomes available before the other, one portion of the display request may be provided to the frame buffer 22 before the other. If an acknowledgment signal is provided to the output controller, the frame buffer interface 200 may wait until all of the portions of the display request have been provided to the frame buffer 22 before generating the acknowledgment signal.

In embodiments using a memory like the 3D-RAM in which memory accesses latency can be reduced by servicing requests in a certain order, there may be additional timing constraints on when display requests are provided to the frame buffer by the frame buffer interface. For example, with 3D-RAMs, the fill latency of each SAM may be hidden if fill requests target alternate banks.

Each SAM may be described as having four states: empty, full, current, and draining. An empty SAM contains no data (e.g., it has not been loaded in response to a display request provided to the frame buffer). A full SAM contains data (e.g., it has been loaded in response to a display request) but it is not currently selected to output data (e.g., because the other SAM is currently outputting data). A current SAM is outputting data to the output controller. As used herein, when a SAM is in the current state, it also indicates that there is time to assert a display request to the other SAM such that the other SAM will be filled by the time the current SAM has finished outputting its data. Thus, if a display request is provided to the second SAM while the first SAM is current, the second SAM will be ready to begin outputting data when the first SAM finishes outputting data. A draining SAM is a SAM that is outputting data. When a SAM is draining, it indicates that there are not enough output cycles remaining in which to hide the latency of the other SAM's fill. Thus, if a display request is provided to the second SAM while the first SAM is draining, the second SAM will not be ready to output display data when the first SAM finishes outputting data.

In one embodiment, at least two types of display requests may be defined for the SAMs: VDX (video transfer) and IVDX (initial video transfer). VDX requests may be used when display requests alternating between even and odd SAMs are provided to each SAM while the other SAM is still current. IVDX requests are used when successive requests do not alternate between the SAMs or when requests targeting one SAM are provided to the frame buffer 22 when the other SAM is not current. IVDX requests may take longer for the frame buffer to respond to (e.g., there may be several cycles of invalid data at port 952 before valid data is output to the output controller while the SAM is filling and/or the output pipeline is cleared of invalid data).

Figure 10:
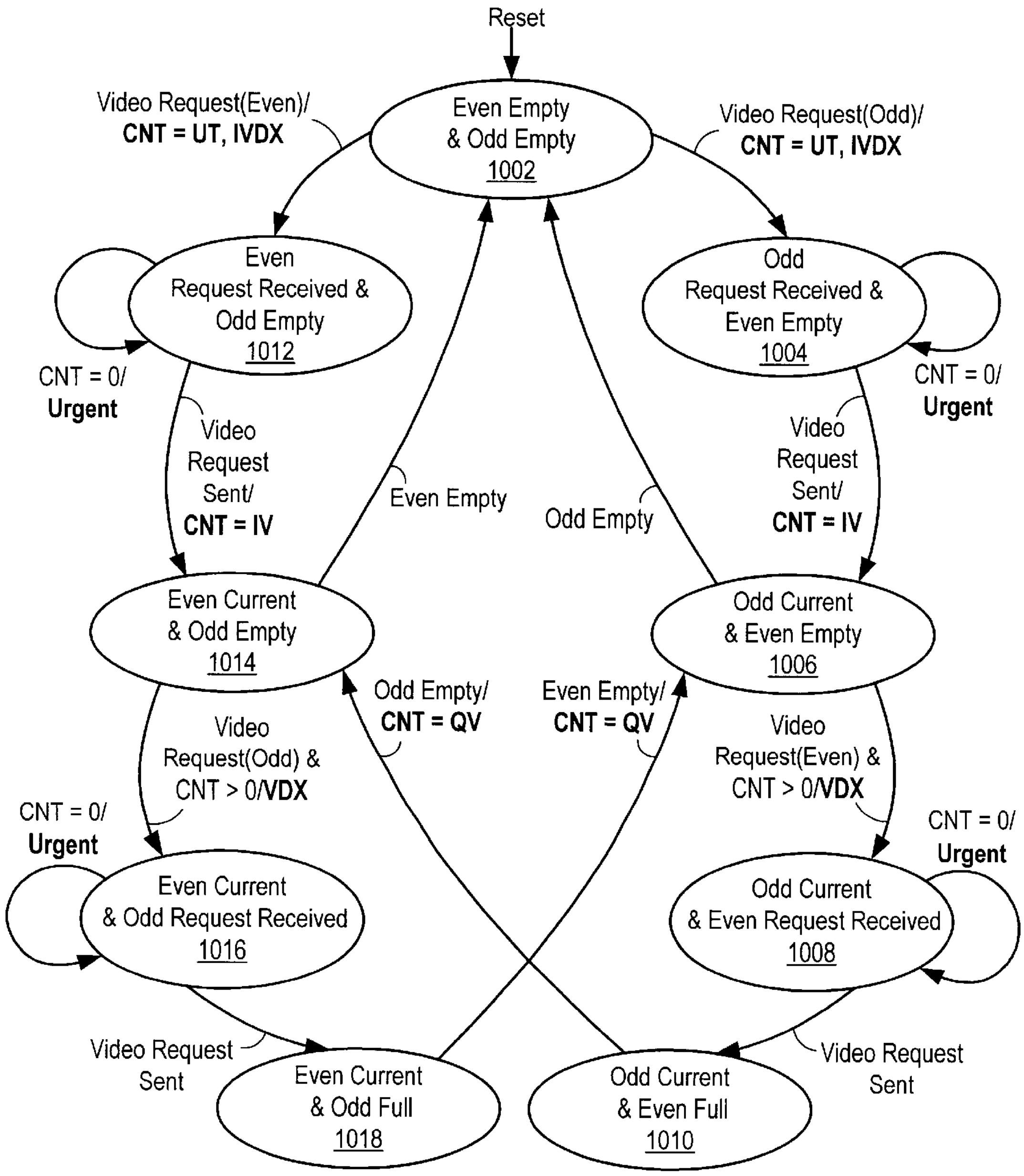
FIG. 10 is a state diagram illustrating how one embodiment of a frame buffer interface may operate.

FIG. 10 shows a state diagram that describes the operation of one embodiment of a frame buffer interface that controls when display requests are provided to the frame buffer. In addition to controlling display requests to have a lessened impact on rendering accesses, this embodiment also controls display requests in order to provide near-continuous output by providing display requests to alternating SAMs before the SAM that is outputting data reaches the draining state. In FIG. 10, controller states are described in terms of the states of the even and odd SAMs (which respectively output data from the even and odd DRAM banks) and/or the display requests that have been received but not yet provided to the frame buffer. Inputs that cause state transitions are labeled on the arrows linking states. State controller outputs are labeled in boldface type on the arrows linking states. Note that other embodiments may be implemented differently than the one shown here.

A reset state in which both the even and the odd SAMs are empty is defined at 1002. In response to the frame buffer interface receiving a display request that targets the odd SAM (e.g., as indicated by the address provided by the video address generator), the frame buffer interface transitions to a state 1004. The frame buffer interface may also generate an internal indication of the type of display request (IVDX) and start an urgency timer (e.g., by setting a counter CNT to equal UT (urgent timer)) in response to receiving the display request. Similarly, if a display request targeting the even SAM is received in the reset state 1002, the frame buffer interface may initiate an urgency timer, indicate that an IVDX will need to be provided to the frame buffer, and transition to a state 1012.

In state 1004, the frame buffer interface may use a method similar to the one shown in FIG. 8 in order to determine when to provide the IVDX to the frame buffer. If there are no pending or current accesses to the targeted bank, the frame buffer interface may provide the IVDX to the frame buffer. Otherwise, the frame buffer interface may wait until the pending or current accesses to the targeted bank complete. If the urgency timer expires (e.g., CNT=0) before the current accesses have completed, the request may become urgent and the frame buffer interface may interrupt the current access and provide the IVDX to the frame buffer. The frame buffer behaves similarly in state 1012 for an IVDX targeting an even bank.

When an IVDX display request is sent to the frame buffer from state 1012 or state 1004, the frame buffer interface may initiate a second timer that indicates when the next request should be asserted in order to provide continuous output from the SAMs. Thus, when the frame buffer interface transitions from state 1004 to state 1006, the frame buffer interface may initiate a counter (CNT) to a value (IV) indicating that if a display request targeting an even bank is received next, that display request should be provided as a VDX request by the time the counter expires. The counter may be set to expire just before the odd SAM enters the draining state, and thus ensure that the VDX is provided to the even SAM while the odd SAM is current. Similarly, when the frame buffer interface transitions from state 1012 to 1014, it may initiate a counter set to a value (IV) that causes a subsequently received display request targeting an odd bank to be provided to the frame buffer while the even SAM is current.

In state 1006, the odd SAM is current (i.e., it is currently outputting data to the output controller and there are enough output cycles remaining that a VDX can be provided to the even SAM) and the even SAM is empty. If no display request targeting an even bank is received while the odd SAM is current, the frame buffer interface may wait until the odd SAM is empty and return to the reset state 1002. If a display request targeting an even bank is received while the odd SAM is current (as indicated by CNT>0), the frame buffer interface may generate an internal indication that a VDX should be provided to the frame buffer and transition to state 1008. Similarly, in state 1014, if a display request targeting an odd bank is received while the even bank is current, the frame buffer interface may transition to state 1016, generating an internal indication that a VDX should be sent to the frame buffer. Otherwise, the frame buffer interface may wait for the even bank to empty and return to the reset state 1002.

In state 1008, the frame buffer interface may provide the VDX targeting an even bank to the frame buffer if the targeted device is not currently being accessed by another device. If the timer expires (CNT=0) before the current access completes, the VDX request may become urgent and the frame buffer interface may interrupt the current access by providing the VDX to the frame buffer. If, before the timer expires, the targeted bank is not being accessed, the frame buffer interface may provide the VDX to the frame buffer. Once the VDX is provided to the frame buffer, the frame buffer interface transitions to state 1010. State 1016 behaves similarly, transitioning to state 1018 when a VDX request targeting an odd bank is provided to the frame buffer. Note that in this embodiment, once the frame buffer has committed to sending a VDX, the frame buffer interface will provide the VDX request to the frame buffer before the current SAM begins draining. In other embodiments, the frame buffer interface may return to the reset state (and consequentially, send the next request as an IVDX) instead of interrupting another device's access to the targeted bank.

In state 1010, the odd bank is still current (or draining) and the even bank is full. As soon as the odd SAM empties, the frame buffer interface may transition to state 1014, indicating that the even SAM is now current and the odd SAM is empty. In response to the odd SAM emptying, the frame buffer interface may initiate a counter (CNT) to a value (QV) indicating the time available in which to provide a VDX targeting an odd bank to the frame buffer. Note that this timer may have a different initial value than the timer initiated after sending an IVDX request to the frame buffer (e.g., this timer may count down in a shorter time period than the counter initiated after an IVDX since the even SAM is already filled). Similarly, in state 1018, the frame buffer interface transitions to state 1006 in response to the even bank emptying. The frame buffer interface also initiates a timer (CNT) to a value (QV) indicating the time available in which to provide a VDX targeting the even SAM to the frame buffer. The values for UT, IV, and QV may be stored in registers accessible by the frame buffer interface. In one embodiment, these registers may be programmable.

Thus, in some embodiments, a frame buffer interface configured as shown in FIG. 10 may control how display requests from an output device are provided to a frame buffer based on both the current accesses to the targeted bank (e.g., in order to decrease the adverse impact on rendering performance) and the current access patterns (e.g., in order to increase performance by sending VDX requests instead of IVDX requests when possible). While other embodiments may use different memory arrangements and memory requests, they may control when display requests are provided to the frame buffer in a similar manner.

Note that requests for display data may be asserted for several different display devices. For example, some graphics systems may output display data to multiple displays. In such systems, successive requests for display data may not be requesting display data for the same output device.

Numerous variations and modifications will become apparent to those skilled in the art once the above disclosure is fully appreciated. It is intended that the following claims be interpreted to embrace all such variations and modifications.

What is claimed is:

1. A graphics system comprising:

a frame buffer;

a processing device coupled to the frame buffer and configured to access data in the frame buffer;

a frame buffer interface coupled to the frame buffer;

an output controller coupled to the frame buffer interface and configured to provide display data to a display device, wherein the output controller is configured to assert a first request for display data;

wherein the frame buffer interface is configured to receive the first request for display data from the output controller and to delay providing the first request for display data to the frame buffer if the processing device is currently accessing a portion of the frame buffer targeted by the first request for display data;

wherein the frame buffer interface is also configured to receive a second request from the output controller; wherein the frame buffer interface is configured to provide the second request to the frame buffer a preselected number of cycles after providing the first request to the frame buffer; and wherein the frame buffer interface is configured to initiate a second request timer in response to receiving the second request, wherein the frame buffer interface is configured to provide the second request to the frame buffer in response to the second timer expiring, wherein the processing device is requesting access to the portion of the frame buffer targeted by the second request when the second timer expires.

2. The graphics system of claim 1, wherein the frame buffer comprises a plurality of banks of memory, wherein the first request for display data targets a first one of the banks of memory and the processing device is currently accessing the first one of the banks.

3. The graphics system of claim 2, wherein the first request comprises a first bank request targeting a first bank in the frame buffer and a second bank request targeting a second bank in the frame buffer, wherein the frame buffer interface is configured to provide the first bank request to the frame buffer at a different time than the second bank request is provided to the frame buffer.

4. The graphics system of claim 3, wherein the frame buffer interface is configured to initiate a first request timer in response to receiving the first request, wherein the frame buffer interface is configured to provide both the first bank request and the second bank request to the frame buffer upon expiration of the timer.

5. The graphics system of claim 1, wherein the frame buffer interface is configured to initiate a first request timer in response to receiving the first request, wherein the frame buffer interface is configured to provide the request to the frame buffer in response to expiration of the first request timer.

6. The graphics system of claim 5, wherein the frame buffer interface includes a queue to store pending requests asserted by the processing device, wherein the frame buffer interface is configured to prioritize selection of a pending request from the queue over selection of the first request, and wherein the frame buffer interface is configured to select the first request instead of selecting a pending request from the queue if the first request timer has expired.

7. The graphics system of claim 1, wherein the frame buffer interface is configured to delay providing the first request for display data to the frame buffer if the processing device is currently asserting a first type of request and to not delay providing the first request for display data to the frame buffer if the processing device is currently asserting a second type of request.

8. The graphics system of claim 1, wherein the frame buffer comprises two or more memory devices, wherein the first request comprises a first request targeting a first memory device in the frame buffer and a second bank request targeting a second memory device, wherein the frame buffer interface is configured to delay providing the first request for display data to the frame buffer if the processing device is currently accessing either the first memory device or the second memory device.

9. A graphics system comprising:

a frame buffer, wherein the frame buffer comprises a plurality of banks of memory;

a processing device coupled to the frame buffer and configured to access data in the frame buffer;

a frame buffer interface coupled to the frame buffer;

an output controller coupled to the frame buffer interface and configured to provide display data to a display device, wherein the output controller is configured to assert a first request for display data, wherein the first request for display data targets a first one of the banks of memory;

wherein the frame buffer interface is configured to receive the first request for display data from the output controller and to delay providing the first request for display data to the frame buffer if the processing device is currently requesting access to the first one of the banks of the frame buffer targeted by the first request for display data;

wherein the frame buffer interface is also configured to receive a second request from the output controller; wherein the frame buffer interface is configured to provide the second request to the frame buffer a preselected number of cycles after providing the first request to the frame buffer; and wherein the frame buffer interface is configured to initiate a second request timer in response to receiving the second request, wherein the frame buffer interface is configured to provide the second request to the frame buffer in response to the second timer expiring, wherein the processing device is requesting access to the portion of the frame buffer targeted by the second request when the second timer expires.

10. The graphics system of claim 9, wherein the frame buffer interface is configured to initiate a first request timer in response to receiving the first request, wherein the frame buffer interface is configured to provide the request to the frame buffer in response to expiration of the first request timer.

11. The graphics system of claim 10, wherein the frame buffer interface includes a queue to store pending requests asserted by the processing device, wherein the frame buffer interface is configured to prioritize selection of a pending request from the queue over selection of the first request unless the first request timer has expired, wherein the frame buffer interface is configured to select the first request instead of selecting a pending request from the queue if the first request timer has expired.

12. The graphics system of claim 9, wherein the frame buffer interface is configured to delay providing the first request for display data to the frame buffer if the processing device is currently asserting a first type of request and to not delay providing the first request for display data to the frame buffer if the processing device is currently asserting a second type of request.

13. The graphics system of claim 9, wherein the first request comprises a first bank request targeting a first bank in the frame buffer and a second bank request targeting a second bank, wherein the frame buffer interface is configured to delay providing the first request for display data to the frame buffer if the processing device is currently requesting access to either the first bank in the first memory device or the second bank in the second memory device.

14. The graphics system of claim 9, wherein the first request comprises a first bank request targeting a first bank in the frame buffer and a second bank request targeting a second bank, wherein the frame buffer interface is configured to provide the first bank request to the frame buffer at a different time than the second bank request is provided to the frame buffer.

15. The graphics system of claim 14, wherein the frame buffer interface is configured to initiate a first request timer in response to receiving the first request, wherein the frame buffer interface is configured to provide both the first bank request and the second bank request to the frame buffer upon expiration of the timer.

16. A graphics system comprising:

means for storing graphics data;

means for processing graphics data, wherein the means for processing graphics data are configured to assert a first request for graphics data stored in the means for storing graphics data;

means for outputting graphics data to a display device, wherein the means for outputting graphics data are configured to assert a second request for graphics data stored in the means for storing graphics data;

means for handling requests, wherein the means for handling requests are coupled to the means for storing graphics data, the means for processing graphics data, and the means for outputting graphics data;

wherein if a first request is targeting a first portion of the means for storing graphics data and a second request is also targeting the first portion, the means for handling requests are configured to first provide the first request to the means for storing graphics data, then provide the second request to the means for storing graphics data a pre-selected number of cycles after providing the first request to the means for storing graphics data or after a timer initiated when the second request was received by the means for handling requests has expired.

17. A method of operating a graphics system, the method comprising:

storing graphics data in a frame buffer;

processing graphics data, wherein the processing device is configured to assert a first request for graphics data stored in the frame buffer;

outputting graphics data to a display device, wherein said outputting is controlled by an output controller and is configured to assert a second request for graphics data stored in the frame buffer;

handling requests in a frame buffer interface, wherein the frame buffer interface is coupled to the frame buffer, the processing device, and the output controller, wherein if a first request targets a first portion of the frame buffer and a second request also targets the first portion, the frame buffer interface is configured to first provide the first request to the frame buffer, then provide the second request to the frame buffer a pre-selected number of cycles after providing the first request or after a second request timer initiated when the second request was received by the frame buffer interface has expired.

* * * * *